(12) United States Patent
Yamashita et al.

(10) Patent No.: US 9,732,247 B2
(45) Date of Patent: *Aug. 15, 2017

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventors: Narumi Yamashita, Kuwana (JP); Hiroyuki Tanaka, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,564

(22) Filed: Aug. 18, 2016

(65) Prior Publication Data

US 2017/0088733 A1    Mar. 30, 2017

(30) Foreign Application Priority Data

Sep. 30, 2015 (JP) .................................. 2015-195498

(51) Int. Cl.
*C08F 287/00* (2006.01)
*C09D 11/38* (2014.01)
(Continued)

(52) U.S. Cl.
CPC ........... *C09D 11/38* (2013.01); *B41J 2/17503* (2013.01); *C09D 11/106* (2013.01); *C09D 11/107* (2013.01); *C09D 11/322* (2013.01); *C09D 11/324* (2013.01); *C09D 153/00* (2013.01); *C08F 212/06* (2013.01); *C08F 220/06* (2013.01); *C08F 220/10* (2013.01); *C08F 257/00* (2013.01); *C08F 265/02* (2013.01); *C08F 265/06* (2013.01); *C08F 287/00* (2013.01); *C08F 293/005* (2013.01)

(58) Field of Classification Search
CPC .......................... C08F 297/026; C08F 293/005
See application file for complete search history.

(56) References Cited

U.S. PATENT DOCUMENTS 4,508,880 A    4/1985 Webster
5,085,698 A    2/1992 Ma et al.
(Continued)

FOREIGN PATENT DOCUMENTS

EP    851012 A2    7/1998
EP    2330154 A1    6/2011
(Continued)

OTHER PUBLICATIONS

May 2, 2017—(EP) Extended Europeon Search Report—App 16184819.7.

*Primary Examiner* — Richard A Huhn
(74) *Attorney, Agent, or Firm* — Banner & Witcoff, Ltd.

(57) ABSTRACT

A water-based ink for ink-jet recording includes: a self-dispersible pigment having an anionic group; water; a water-soluble resin; and an anionic surfactant, wherein the water-soluble resin is an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

14 Claims, 1 Drawing Sheet

(51) Int. Cl.

| | | |
|---|---|---|
| *B41J 2/175* | (2006.01) | |
| *C09D 11/106* | (2014.01) | |
| *C09D 11/324* | (2014.01) | |
| *C09D 153/00* | (2006.01) | |
| *C09D 11/107* | (2014.01) | |
| *C09D 11/322* | (2014.01) | |
| *C08F 293/00* | (2006.01) | |
| *C08F 212/06* | (2006.01) | |
| *C08F 257/00* | (2006.01) | |
| *C08F 220/10* | (2006.01) | |
| *C08F 265/06* | (2006.01) | |
| *C08F 220/06* | (2006.01) | |
| *C08F 265/02* | (2006.01) | |

(56) References Cited

U.S. PATENT DOCUMENTS

| | | | |
|---|---|---|---|
| 5,221,334 A | 6/1993 | Ma et al. | |
| 5,272,201 A | 12/1993 | Ma et al. | |
| 5,609,671 A | 3/1997 | Nagasawa | |
| 5,837,045 A | 11/1998 | Johnson et al. | |
| 6,620,229 B2 | 9/2003 | Doi et al. | |
| 7,819,962 B2 | 10/2010 | Gu | |
| 7,922,805 B2 | 4/2011 | Kowalski et al. | |
| 8,016,404 B2 | 9/2011 | Kato et al. | |
| 8,858,695 B2 | 10/2014 | Gu et al. | |
| 9,120,948 B2 | 9/2015 | Shimanaka et al. | |
| 2003/0008080 A1 | 1/2003 | Doi et al. | |
| 2003/0195274 A1* | 10/2003 | Nakamura | B01J 13/04 523/160 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2009/0229489 A1 | 9/2009 | Gu | |
| 2010/0062160 A1 | 3/2010 | Yanagi et al. | |
| 2010/0143590 A1* | 6/2010 | Held | C08F 293/005 427/256 |
| 2011/0223529 A1 | 9/2011 | Shimanaka et al. | |
| 2012/0075381 A1 | 3/2012 | Wachi | |
| 2013/0196064 A1 | 8/2013 | Shimanaka et al. | |
| 2016/0075880 A1 | 3/2016 | Gu et al. | |

FOREIGN PATENT DOCUMENTS

| | | |
|---|---|---|
| EP | 2423272 A2 | 2/2012 |
| JP | H05-179183 A | 7/1993 |
| JP | H08-3498 A | 1/1996 |
| JP | 2000-144028 A | 5/2000 |
| JP | 2000-513396 A | 10/2000 |
| JP | 2004-359803 A | 12/2004 |
| JP | 2006-008898 A | 1/2006 |
| JP | 2007-131684 A | 5/2007 |
| JP | 2008-524400 A | 7/2008 |
| JP | 2008-246821 A | 10/2008 |
| JP | 2009-515007 A | 4/2009 |
| JP | 2009-235323 A | 10/2009 |
| JP | 2011-515535 A | 5/2011 |
| JP | 2014-070184 A | 4/2014 |
| WO | 2004-104119 A1 | 12/2004 |
| WO | 2010-013651 A1 | 2/2010 |

* cited by examiner

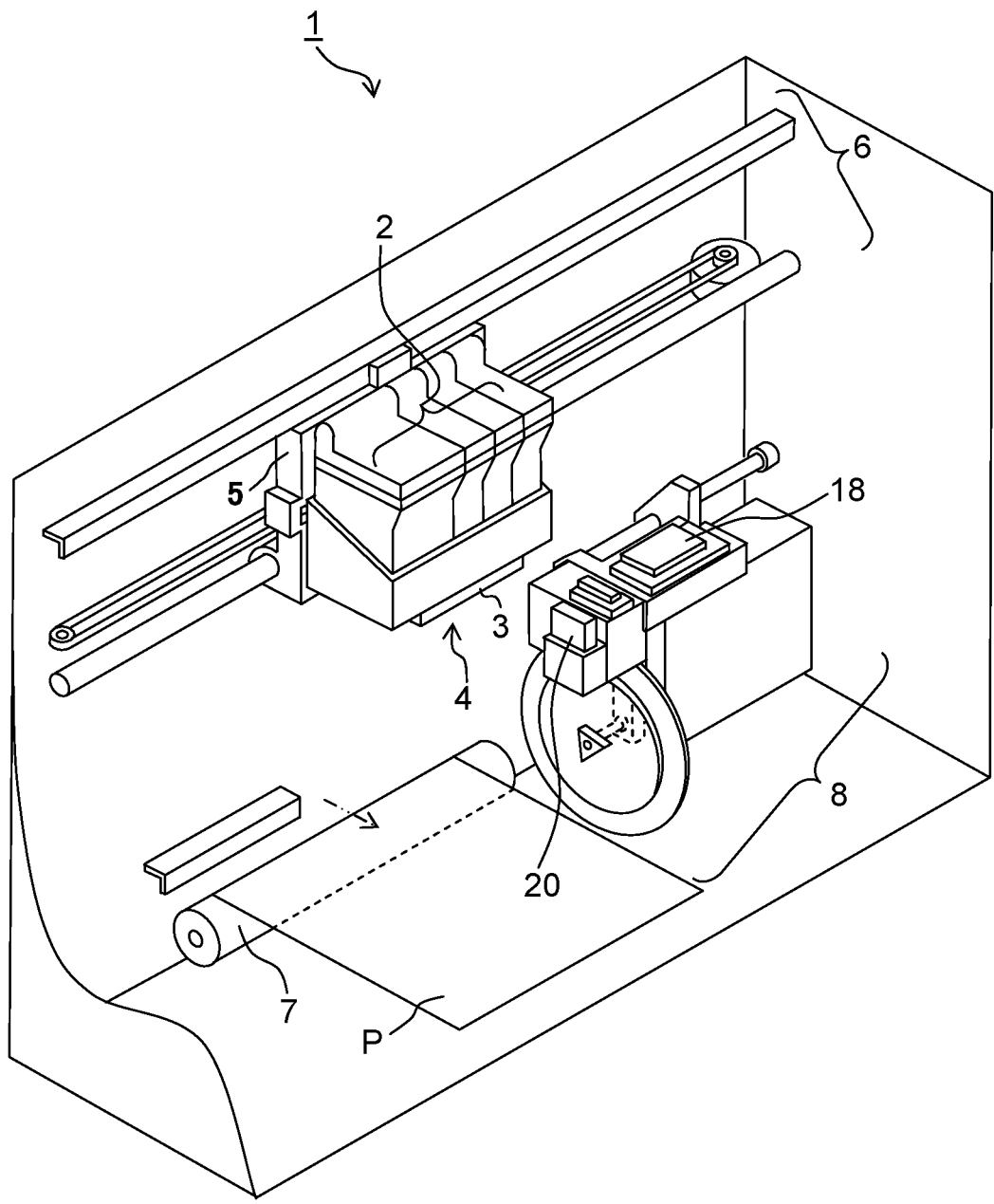

WATER-BASED INK FOR INK-JET RECORDING AND INK CARTRIDGE

CROSS REFERENCE TO RELATED APPLICATION

The present application claims priority from Japanese Patent Application No. 2015-195498 filed on Sep. 30, 2015, the disclosure of which is incorporated herein by reference in its entirety.

BACKGROUND OF THE INVENTION

Field of the Invention

The present invention relates to a water-based ink for ink-jet recording and an ink cartridge.

Description of the Related Art

Ink-jet recording is conventionally performed by using water-based pigment inks for ink-jet recording in which pigments are used as colorant. If pigment particles of the water-based pigment ink are unstably dispersed in water, jetting stability of the water-based pigment ink from an ink-jet head deteriorates. In order to solve the problem, for example, Japanese Patent Application laid-open No. 2004-359803 discloses a water-based pigment ink containing a pigment, a block polymer of ethylene oxide and isopropylene oxide, and water. This water-based pigment ink containing the block polymer can improve the jetting stability.

Recent ink-jet recording using the water-based ink for ink-jet recording needs higher quality images and higher speed operation. In connection with this demand, water-based pigment inks for ink-jet recording need a novel technology to further improve the jetting stability.

In view of the above, an object of the present teaching is to provide a water-based pigment ink for ink-jet recording having good jetting stability.

SUMMARY OF THE INVENTION

According to a first aspect of the present teaching, there is provided a water-based ink for ink-jet recording including: a self-dispersible pigment having an anionic group; water; a water-soluble resin; and an anionic surfactant, wherein the water-soluble resin is an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

According to a second aspect of the present teaching, there is provided an ink cartridge which includes the water-based ink for ink-jet recording as defined in the first aspect.

BRIEF DESCRIPTION OF THE DRAWINGS

The FIGURE is a schematic perspective view of an exemplary configuration of an ink-jet recording apparatus of the present teaching.

DESCRIPTION OF THE EMBODIMENTS

An explanation will be made about a water-based ink for ink-jet recording of the present teaching (hereinafter also referred to as "water-based ink" or "ink" in some cases). The water-based ink for ink-jet recording of the present teaching contains a self-dispersible pigment having an anionic group (hereinafter referred to as "anionic self-dispersible pigment" in some cases), water, a water-soluble resin, and an anionic surfactant.

The anionic self-dispersible pigment is dispersible in water without using any dispersant, for example, owing to the fact that at least one of a hydrophilic functional group and the salt thereof including, for example, sulfonic acid group (sulfonate group), carboxylic acid group, and phosphoric acid group (phosphate group) is introduced into the surfaces of the pigment particles by the chemical bond directly or with any group intervening therebetween. The water-based ink using the anionic self-dispersible pigment has no problem of the increase in viscosity which would be otherwise caused by a polymeric pigment dispersant, and thus it is easy to handle.

It is possible to use anionic self-dispersible pigments subjected to the surface treatment by any one of methods described, for example, in Japanese Patent Application Laid-open No. HEI8-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/0201380), Published Japanese Translation of PCT International Publication for Patent Application No. 2009-515007 (corresponding to United States Patent Application Publications No. US 2007/0100023 and No. US 2007/0100024), and Published Japanese Translation of PCT International Publication for Patent Application No. 2011-515535 (corresponding to United States Patent Application Publication No. US 2009/0229489). Those usable as raw materials of the anionic self-dispersible pigment include, for example, carbon black, inorganic pigment, and organic pigment. The carbon black includes, for example, furnace black, lamp black, acetylene black, and channel black. The inorganic pigment includes, for example, titanium oxide, iron oxide-based inorganic pigment, and carbon black-based inorganic pigment. The organic pigment includes, for example, azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. Other pigments are also usable and are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments.

The anionic self-dispersible pigment may be a pigment, in which at least one of the carboxylic acid group and the salt thereof is introduced into the surfaces of carbon black particles by the chemical bond directly or with any group intervening therebetween, namely, a self-dispersible carbon black modified by the carboxylic acid group. Or, the anionic self-dispersible pigment may be a pigment, in which at least one of the sulfonic acid group and the salt thereof is introduced into the surfaces of carbon black particles by the chemical bond directly or with any group intervening therebetween, namely, a self-dispersible carbon black modified by the sulfonic acid group. Or, the anionic self-dispersible pigment may be a pigment, in which at least one of the phosphoric acid group (phosphate group) and the salt thereof is introduced into the surfaces of carbon black particles by the chemical bond directly or with any group intervening therebetween, namely, a self-dispersible carbon black modified by the phosphoric acid group (phosphate group).

As the anionic self-dispersible pigment, for example, commercially available products may be used. Examples of the commercially available products include "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The solid content blending amount of the anionic self-dispersible pigment (pigment solid content amount) in the entire amount of the water-based ink is not particularly limited, and may be appropriately determined based on desired optical density, color (hue, tint), or the like. The pigment solid content amount is, for example, in a range of 0.1% by weight to 20% by weight, 3% by weight to 15% by weight, or 3% by weight to 10% by weight.

As the colorant, the water-based ink may or may not contain, for example, another pigment and a dye, in addition to the anionic self-dispersible pigment. The main component of the colorant in the water-based ink is the anionic self-dispersible pigment.

The water is preferably ion-exchanged water or pure water (purified water). The blending amount of the water in the entire amount of the water-based ink (the proportion of the water in the water-based ink) is, for example, in a range of 10% by weight to 90% by weight, and preferably in a range of 40% by weight to 80% by weight. The proportion of the water in the water-based ink may be, for example, a balance of the other components.

The water-soluble resin is prepared by neutralizing a part or all of an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; and which has an acid value of 90 mgKOH/g to 200 mgKOH/g.

The water-based ink, which contains the water-soluble resin and the anionic surfactant, has good jetting stability. The mechanisms improving the jetting stability are assumed, for example, as follows. Namely, the dispersion stability of the anionic self-dispersible pigment in the water-based ink is improved by the electrostatic repulsion caused between the anionic self-dispersible pigment and the hydrophilic polymer block A of the water-soluble resin. Further, the polymer block A adsorbs to a nozzle surface of an ink-jet head to cover the nozzle surface with the water-soluble resin, thereby making it possible to jet the water-based ink smoothly from nozzles. These improve the jetting stability. The ABA-type triblock copolymer can get greater effects of the polymer block A compared to a resin composed only of the polymer block A or a random copolymer containing the component of the polymer block A. Further, adding the anion surfactant to the water-based ink further enhances the dispersion stability of the anionic self-dispersible pigment, thereby making it possible to prevent the occurrence of aggregation or coagulation of the anionic self-dispersible pigment which would otherwise cause the jetting instability. This also improves the jetting stability. The above mechanisms, however, are just assumptions and the present teaching is not limited thereto.

The weight average molecular weight of the water-soluble resin is in a range of 3,000 to 30,000, for example, in a range of 5,200 to 30,000. The water-soluble resin has only to have such a configuration that one polymer block B is sandwiched by two polymer blocks A. The ratio of the weight average molecular weight of each polymer block A to the weight average molecular weight of the polymer block B is not particularly limited. The ratio may be, for example, A:B:A=1:1:1, or any other ratio is also allowable. The ratio of the weight average molecular weight of the polymer block A to the weight average molecular weight of the polymer block B is, for example, (A/B)=0.2 to 8, preferably 0.5 to 2. Making the weight average molecular weights of the polymer blocks A, B within the above ranges further improves the jetting stability of the water-based ink. It is preferred that the two polymer blocks A at both ends of water-soluble resin molecules have substantially the same weight average molecular weight. The weight average molecular weight can be measured, for example, in accordance with JISK0124.

The acid value of the water-soluble resin is in a range of 90 mgKOH/g to 200 mgKOH/g, for example, in a range of 100 mgKOH/g to 200 mgKOH/g. The acid value can be measured, for example, in accordance with JISK0070.

Each polymer block A of the ABA-type triblock copolymer is a random copolymer composed only of methyl methacrylate and methacrylic acid. The weight ratio of the methyl methacrylate to the methacrylic acid is, for example, (methyl methacrylate)/(methacrylic acid)=1.7 to 3.8. The polymer block B of the ABA-type triblock copolymer is a random copolymer composed only of benzyl methacrylate and methacrylic acid. The weight ratio of the benzyl methacrylate to the methacrylic acid is, for example, (benzyl methacrylate)/(methacrylic acid)=3.8 to 32.0. In the ABA-type triblock copolymer, each polymer block A is hydrophilic and the polymer block B is hydrophobic. When the polymer blocks A, B contain monomers so that their weight ratios are within the above ranges, it is possible to obtain the well balance between the hydrophilic property of each polymer block A and the hydrophobic property of the polymer block B. This further improves the jetting stability of the water-based ink.

The water-soluble resin is prepared by neutralizing a part or all of the ABA-type triblock copolymer. In particular, a part or all of the methacrylic acid in the ABA-type triblock copolymer is neutralized by a neutralizer which is a base. The neutralization improves the solubility of the water-soluble resin. Although the neutralizer is not particularly limited, for example, potassium hydroxide may be used.

The water-soluble resin may be prepared, for example, privately or independently, or any commercially available product may be used for the water-soluble resin. The water-soluble resin may be prepared, for example, by a step-by-step polymerization method. The step-by-step polymerization method is exemplified, for example, by an anion polymerization method or a group transfer polymerization method described in U.S. Pat. No. 4,508,880. In the group transfer polymerization method, an initiator may be nonfunctional, may contain an acid group, or may contain an amino group. Further, the water-soluble resin may be prepared, for example, by an anion polymerization method or a group transfer polymerization method in which one of the two polymer blocks A is polymerized first, the polymer block B is polymerized second, and the other of the two polymer blocks A is polymerized last. A specific example of the preparation method of the water-soluble resin will be explained, for example, in EXAMPLES as described later. The above preparation methods, however, are merely examples, and the water-soluble resin may be prepared by any other method.

The blending amount of the water-soluble resin in the entire amount of the water-based ink is, for example, in a range of 0.01% by weight to 10% by weight, 0.02% by weight to 5% by weight, or 0.04% by weight to 1% by weight.

The anionic surfactant is exemplified, for example, by alkyl sulfate, alkyl sulfuric acid ester salt, alkyl ether sulfuric ester salt, alkylbenzene sulfonate, alkyl phosphate, α-olefin sulfonic acid sodium salt, and sulfosuccinic acid salt. For example, any commercially available product may be used as the anionic surfactant. Examples of the commercially available product include "LIPOLAN (trade name)" series, "LIPON (trade name)" series, "SUNNOL (trade name)" series, "LIPOTAC (trade name)" series, "ENAGICOL (trade name)" series, "LIPAL (trade name)" series, and "LOTAT (trade name) series produced by LION SPECIALITY CHEMICALS CO., LTD.; "EMAL (trade name)" series, "LATEMUL (trade name)" series, "VENOL (trade name)" series, "NEOPELEX (trade name)" series, NS SOAP, KS SOAP, OS SOAP, and "PELEX (trade name)" series produced by Kao Corporation; "SANDET (trade name)" series and "BEAULIGHT (trade name)" series produced by Sanyo Chemical Industries, Ltd.; "ALSCOPE (trade name)" series, "NEOSCOPE (trade name)" series, and "PHOSPHANOL (trade name)" series produced by TOHO Chemical Industry Co., Ltd.; and sodium hexadecyl sulfate and sodium stearyl sulfate produced by TOKYO CHEMICAL INDUSTRY CO., LTD.

It is preferred that the anionic surfactant contain a compound represented by the following formula (1). The compound represented by the formula (1) is superior in terms of a foaming property and a hydrophilic property to any other anionic surfactants. Thus, it is assumed that the compound represented by the formula (1) further prevents the occurrence of aggregation of the anionic self-dispersible pigment which would be otherwise generated in the water-based ink and the vicinity of nozzles of the ink-jet head, thereby further improving the jetting stability. When the compound represented by the formula (1) has an alkylene oxide chain, it is assumed that the steric repulsion by the alkylene oxide chain also prevents the occurrence of aggregation of the anionic self-dispersible pigment. The present teaching, however, is not limited to the above assumptions.

(1)

in the formula (1),
R$^1$ is an alkyl group;
R$^2$ is an ethylene group or a propylene group;
n is an integer in a range of 0 to 10; and
M is alkali metal, alkali earth metal, ammonium, or alkanolamine.

In the formula (1), R$^1$ is, for example, an alkyl group having 8 to 18 carbon atoms; R$^2$ is, for example, an ethylene group; and n is, for example, an integer in a range of 1 to 10.

In the formula (1), M may be, for example, sodium, potassium, calcium, magnesium, NH$_4$, NH(C$_2$H$_4$OH)$_3$, NH$_2$(C$_2$H$_4$OH)$_2$, or NH$_3$—C$_2$H$_4$OH. Among the above, it is preferred that M be sodium, potassium, or ammonium.

As the compound represented by the formula (1), among the above commercially available products of the anionic surfactant, "SUNNOL (trade name)" series produced by LION SPECIALITY CHEMICALS CO., LTD. or "EMAL (trade name)" series produced by Kao Corporation may be used.

The blending amount of the anionic surfactant in the entire amount of the water-based ink is, for example, in a range of 0.01% by weight to 10% by weight, 0.02% by weight to 3% by weight, or 0.04% by weight to 1.5% by weight.

In the water-based ink, the weight ratio between the water-soluble resin (C) and the anionic surfactant (S) is, for example, C:S=1:0.5 to 50, C:S=1:0.5 to 10, C:S=1:1 to 5, or C:S=1:1 to 2.5. Namely, the weight ratio (S/C) of the blending amount (S) of the anionic surfactant to the blending amount (C) of the water-soluble resin is, for example, (S/C)=0.5 to 50, preferably (S/C)=0.5 to 10, more preferably (S/C)=1 to 5, and further more preferably (S/C)=1 to 2.5. Making the weight ratio of the blending amount of the anionic surfactant to the blending amount of the water-soluble resin within the above ranges further improves the jetting stability.

The weight ratio (P/C) of the blending amount (P) of the anionic self-dispersible pigment to the blending amount (C) of the water-soluble resin is, for example, (P/C)=2 to 300, and preferably (P/C)=8 to 160. Making the weight ratio of the blending amount of the anionic self-dispersible pigment to the blending amount of the water-soluble resin within the above ranges further improves the dispersion stability of the anionic self-dispersible pigment, which in turn results in further-improved jetting stability.

In the water-based ink, the weight ratio (P/(C+S)) of the blending amount (P) of the anionic self-dispersible pigment to the total blending amount (C+S) of the water-soluble resin and the anionic surfactant is, for example, (P/(C+S))=1 to 160, and preferably (P/(C+S))=3 to 60. Making the weight ratio of the blending amount of the anionic self-dispersible pigment to the total blending amount of the water-soluble resin and the anionic surfactant within the above ranges further improves the dispersion stability of the anionic self-dispersible pigment, which in turn results in further-improved jetting stability.

The water-based ink may further contain a water-soluble organic solvent. The water-soluble organic solvent is exemplified, for example, by a humectant which prevents the water-based ink from drying at an end of a nozzle in an ink-jet head and a penetrant which adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above-described humectants, the use of polyvalent alcohols such as alkylene glycol and glycerol is preferred, and the use of glycerol is more preferred.

The blending amount of the humectant in the entire amount of the water-based ink is, for example, in a range of 0% by weight to 95% by weight, 5% by weight to 80% by weight, or 5% by weight to 50% by weight.

The penetrant includes, for example, glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One kind of the penetrant may be used singly, or two or more kinds of the penetrants may be used in combination. Among the above penetrants, the use of triethylene glycol-n-butyl ether is preferred.

The blending amount of the penetrant in the entire amount of the water-based ink is, for example, in a range of 0% by weight to 20% by weight, 0% by weight to 15% by weight, or 1% by weight to 8% by weight.

The water-based ink may contain glycerol as the humectant and triethylene glycol-n-butyl ether as the penetrant. The glycerol and triethylene glycol-n-butyl ether in the water-based ink of the present teaching exert great effects as the humectant and the penetrant, respectively.

The water-based ink may further contain a conventionally known additive, as necessary. The additive includes, for example, pH-adjusting agents, viscosity-adjusting agents, surface tension-adjusting agents, and fungicides. The viscosity-adjusting agents include, for example, polyvinyl alcohol, cellulose, and water-soluble resin.

The water-based ink can be prepared, for example, such that the anionic self-dispersible pigment, the water-soluble resin, the anionic surfactant, water, and optionally other additive component(s) are mixed uniformly or homogeneously by any conventionally known method, and undissolved matters are removed by a filter or the like.

The water-based ink for ink-jet recording of the present teaching containing the self-dispersible pigment having the anionic group, the water-soluble resin, and the anionic surfactant has good jetting stability.

Next, the ink cartridge of the present teaching is characterized by being an ink cartridge containing a water-based ink for ink-jet recording; wherein the water-based ink for ink-jet recording is the water-based ink for ink-jet recording of the present teaching. For example, any conventionally known main body (body) of an ink cartridge can be used for the main body of the ink cartridge of the present teaching.

Next, an explanation will be given about an ink-jet recording apparatus and an ink-jet recording method of the present teaching.

The ink-jet recording apparatus of the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink for ink-jet recording of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink.

The ink-jet recording method of the present teaching can be practiced, for example, by using the ink-jet recording apparatus of the present teaching. The recording includes printing a letter (text), printing an image, printing, etc.

The FIGURE depicts an exemplary configuration of the ink-jet recording apparatus of the present teaching. As depicted in the FIGURE, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. At least one water-based ink among the four colors of water-based inks is the water-based ink for ink-jet recording of the present teaching. The ink-jet head 3 disposed on the head unit 4 performs recording on a recording medium (for example, recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (see, for example, Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In the FIGURE, a cap 18 is provided to cover a plurality of nozzles of the ink-jet head 3 which is returned to a reset position upon completion of the recording, so as to prevent the water-based inks from drying.

In the ink-jet recording apparatus 1 of this embodiment, the four ink cartridges 2 are provided, together with the head unit 4, on one carriage 5. However, the present teaching is not limited to this. In the ink-jet recording apparatus 1, the respective four cartridges 2 may be provided on a carriage which is different (separate) from the carriage on which the head unit 4 is provided. Alternatively, the respective four cartridges 2 may be arranged and fixed inside the ink-jet recording apparatus 1, rather than being provided on the carriage 5. In such aspects, for example, each of the four cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed from a feed cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The water-based ink of the present teaching has good jetting stability, and thus it can be stably discharged from the ink-jet head 3. The recording paper P after the recording is discharged from the ink-jet recording apparatus 1. In the FIGURE, illustration of the feed mechanism and discharge mechanism for the recording paper P is omitted.

In the apparatus depicted in the FIGURE, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and is not restricted to the examples and comparative examples which will be described below.

[Preparation of Water-Soluble Resin]

The water-soluble resin was synthesized by a living radical polymerization technique. 2-iodo-2-cyanopropane, azobisisobutyronitrile, iodosuccinimide, methyl methacrylate, and methacrylic acid were added to diethylene glycol dimethyl ether under a nitrogen atmosphere, and the temperature of this mixture was raised, thereby promoting and completing the polymerization reaction. Next, a mixture of benzyl methacrylate and methacrylic acid was added and polymerized. After that, a mixture of methyl methacrylate and methacrylic acid was added and polymerized. Accordingly, an ABA-type triblock copolymer was obtained. Further, the aqueous solution of a water-soluble resin 1 in TABLES 1 to 4 in which the weight average molecular weight was 10,000 and the acid value was 130 mgKOH/g was obtained by distilling off diethylene glycol dimethyl ether under reduced pressure and adding purified water and potassium hydroxide. The aqueous solutions of water-soluble resins 2 to 5 in TABLE 1 were obtained in a similar manner as the aqueous solution of the water-soluble resin 1, except that a polymerization temperature, polymerization solvent, initiator, monomer composition, radical generator, catalyst, neutralizer, and polymerization time were changed appropriately. The monomer weight ratios of the water-soluble resins 1 to 5 (methyl methacrylate/methacrylic acid//benzyl methacrylate/methacrylic acid//methyl methacrylate/methacrylic acid) are as follows. Two slashes mean separation between blocks, one slash means a random copolymer.

Water-soluble resin 1
0.25/0.09//0.31/0.03//0.25/0.09
Water-soluble resin 2
0.21/0.12//0.27/0.07//0.21/0.12
Water-soluble resin 3
0.26/0.07//0.32/0.01//0.26/0.07
Water-soluble resin 4
0.22/0.11//0.28/0.06//0.22/0.11
Water-soluble resin 5
0.25/0.09//0.31/0.03//0.25/0.09

[Preparation of Random Copolymer]

The random copolymer was synthesized similarly to the water-soluble resin by the living radical technique, except that the methyl methacrylate, methacrylic acid, and benzyl methacrylate were collectively mixed all together. Further, the aqueous solution of the random copolymer in TABLE 1 in which the weight average molecular weight was 10,000 and the acid value was 130 mgKOH/g was obtained by distilling off diethylene glycol dimethyl ether under reduced pressure and adding purified water and potassium hydroxide. The monomer weight ratio of the random copolymer (methyl methacrylate/methacrylic acid/benzyl methacrylate) is as follows. One slash means a random copolymer.

Random Copolymer
0.43/0.24/0.27

Examples 1-1 to 1-5, Comparative Examples 1-1 and 1-2

Examples 1-1 to 1-5 were examples using mutually different water-soluble resins. Components, except for an anionic self-dispersible pigment and the water-soluble resin, which were included in Water-based ink composition (TABLE 1) were mixed uniformly or homogeneously; and thus an ink solvent was obtained. Subsequently, the aqueous solution of the water-soluble resin and the ink solvent were added to the anionic self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 1-1 to 1-5 was obtained. The water-based ink for ink-jet recording of Comparative Example 1-1 was obtained in a similar manner as Examples 1-1 to 1-5, except that the aqueous solution of the random copolymer was used instead of the aqueous solution of the water-soluble resin. The water-based ink for ink-jet recording of Comparative Example 1-2 was obtained in a similar manner as Examples 1-1 to 1-5, except that the aqueous solution of the water-soluble resin was not used.

Regarding the water-based inks of Examples 1-1 to 1-5 and Comparative Examples 1-1 and 1-2, jetting stability evaluation was performed by the following method.

[Jetting Stability Evaluation]

An ink-jet printer "MFC-J45410N" manufactured by BROTHER KOGYO KABUSHIKI KAISHA was used to perform continuous recording with ten-million dots (about 3000 sheets) on "Office Paper W" (recording paper) produced by FUJITSU COWORCO LIMITED, by using the water-based inks of Examples 1-1 to 1-5 and Comparative Examples 1-1 and 1-2. The results of continuous recording were evaluated based on the following evaluation criteria. Note that "non-ejection" means a state in which nozzles of an ink-jet head are clogged and the water-based ink can not be jetted therefrom, and "deflection" means that dots do not land on intended landing positions (ideal landing positions) of a recording medium to be deviated from the intended landing positions, namely, "deflection" means a state in which landing errors occurred.

<Evaluation Criteria for Jetting Stability Evaluation>

AA: Deflection and non-ejection were not observed in continuous recording.

A: Deflection and non-ejection were observed in continuous recording, but purge recovered performance.

C: Deflection and non-ejection were observed in continuous recording, and purge failed to recover performance.

TABLE 1 shows the water-based ink compositions and the evaluation results for the water-based inks of Examples 1-1 to 1-5 and Comparative Examples 1-1 and 1-2.

TABLE 1 (following)—LEGEND

*1: Anionic self-dispersible black pigment (self-dispersible carbon black modified by a carboxylic acid group); produced by Cabot Corporation

*2: Anionic surfactant (a compound represented by the formula (1)); produced by LION SPECIALITY CHEMICALS CO., LTD.

*3: Anionic surfactant (a compound represented by the formula (1)); produced by Kao Corporation Regarding numerals in TABLE 1, those of the anionic self-dispersible pigment and the water-soluble resins indicate solid content amounts and that of the surfactants indicates an active ingredient.

anionic self-dispersible pigment and the water-soluble resin, which were included in Water-based ink composition (TABLE 2) were mixed uniformly or homogeneously; and thus an ink solvent was obtained. Subsequently, the aqueous solution of the water-soluble resin and the ink solvent were added to the anionic self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 2-1 and 2-2 and Comparative Examples 2-1 and 2-2 was obtained.

Regarding the water-based inks of Examples 2-1 and 2-2 and Comparative Examples 2-1 and 2-2, jetting stability evaluation was performed in a similar manner as Examples 1-1 to 1-5 and Comparative Examples 1-1 and 1-2.

TABLE 2 shows the water-based ink compositions and the evaluation results for the water-based inks of Examples 2-1 and 2-2 and Comparative Examples 2-1 and 2-2. Note that TABLE 2 also shows the water-based ink composition and the evaluation result for the water-based ink of Example 1-1.

TABLE 2 (following)—LEGEND

*1: Anionic self-dispersible black pigment (self-dispersible carbon black modified by a carboxylic acid group); produced by Cabot Corporation

TABLE 1

|  |  |  |  | Examples |  |  |  |  | Comparative Examples |  |
|---|---|---|---|---|---|---|---|---|---|---|
|  |  |  |  | 1-1 | 1-2 | 1-3 | 1-4 | 1-5 | 1-1 | 1-2 |
| Water-based ink composition (% by weight) | CAB-O-JET (trade name) 300 (*1) |  |  | 8.00 | 8.00 | 8.00 | 8.00 | 8.00 | 8.00 | 8.00 |
|  |  | Weight average molecular weight | Acid value mgKOH/g |  |  |  |  |  |  |  |
|  | Water-soluble resin 1 | 10000 | 130 | 0.10 | — | — | — | — | — | — |
|  | Water-soluble resin 2 | 9000 | 200 | — | 0.10 | — | — | — | — | — |
|  | Water-soluble resin 3 | 14500 | 99 | — | — | 0.10 | — | — | — | — |
|  | Water-soluble resin 4 | 5200 | 174 | — | — | — | 0.10 | — | — | — |
|  | Water-soluble resin 5 | 30000 | 130 | — | — | — | — | 0.10 | — | — |
|  | Random copolymer | 8000 | 191 | — | — | — | — | — | 0.10 | — |
|  | SUNNOL (trade name) NL1430 (*2) |  |  | — | 0.15 | 0.15 | 0.15 | 0.15 | 0.15 | 0.15 |
|  | EMAL (trade name) 20C (*3) |  |  | 0.15 | — | — | — | — | — | — |
|  | Glycerol |  |  | 15.00 | 15.00 | 15.00 | 15.00 | 15.00 | 15.00 | 15.00 |
|  | Triethylene glycol-n-butyl ether |  |  | 5.00 | 5.00 | 5.00 | 5.00 | 5.00 | 5.00 | 5.00 |
|  | Water |  |  | balance | balance | balance | balance | balance | balance | balance |
| Water-soluble resin:Anionic surfactant (C:S) |  |  |  | 1:1.5 | 1:1.5 | 1:1.5 | 1:1.5 | 1:1.5 | — | — |
| Jetting stability |  |  |  | AA | AA | AA | AA | AA | C | C |

As shown in TABLE 1, Examples 1-1 to 1-5 had very good evaluation results of jetting stability. Meanwhile, Comparative Example 1-1 in which the random copolymer was used instead of the water-soluble resin and Comparative Example 1-2 in which no water-soluble resin was used had bad evaluation results of jetting stability.

Examples 2-1 and 2-2, Comparative Examples 2-1 and 2-2

Examples 2-1 and 2-2 were examples using mutually different anionic surfactants. Components, except for the

*3: Anionic surfactant (a compound represented by the formula (1)); produced by Kao Corporation

*4: Anionic surfactant; produced by Kao Corporation

*5: Anionic surfactant; produced by Kao Corporation

*6: Nonionic surfactant; produced by Kao Corporation

Regarding numerals in TABLE 2, those of the anionic self-dispersible pigment and the water-soluble resin indicate solid content amounts and that of the surfactants indicates an active ingredient.

TABLE 2

|  |  | Examples | | | Comparative Examples | |
|---|---|---|---|---|---|---|
|  |  | 1-1 | 2-1 | 2-2 | 2-1 | 2-2 |
| Water-based ink composition (% by weight) | CAB-O-JET (trade name) 300 (*1) | 8.00 | 8.00 | 8.00 | 8.00 | 8.00 |
|  | Water-soluble resin 1 — Weight average molecular weight 10000, Acid value 130 mgKOH/g | 0.10 | 0.10 | 0.10 | 0.10 | 0.10 |
|  | EMAL (trade name) 20C (*3) | 0.15 | — | — | — | — |
|  | NEOPELEX (trade name) G-15 (*4) | — | 0.15 | — | — | — |
|  | DEMOL (trade name) NL (*5) | — | — | 0.15 | — | — |
|  | EMULGEN (trade name) 120 (*6) | — | — | — | 0.15 | — |
|  | Glycerol | 15.00 | 15.00 | 15.00 | 15.00 | 15.00 |
|  | Triethylene glycol-n-butyl ether | 5.00 | 5.00 | 5.00 | 5.00 | 5.00 |
|  | Water | balance | balance | balance | balance | balance |
| Water-soluble resin:Anionic surfactant (C:S) | | 1:1.5 | 1:1.5 | 1:1.5 | — | — |
| Jetting stability | | AA | A | A | C | C |

As shown in TABLE 2, Examples 2-1 and 2-2 had good evaluation results of jetting stability. However, Examples 2-1 and 2-2, in which any other anionic surfactants than the compound represented by the formula (1) were used as anionic surfactants, had evaluation results of jetting stability which were slightly inferior to Example 1-1 in which the compound represented by the formula (1) was used. Meanwhile, Comparative Example 2-2 in which no anionic surfactant was used and Comparative Example 2-1 in which the nonionic surfactant was used instead of the anionic surfactant had bad evaluation results of jetting stability.

Examples 3-1 to 3-6

Examples 3-1 to 3-6 were examples using mutually different anionic self-dispersible pigments and weight ratios (C:S). Components, except for the anionic self-dispersible pigment and the water-soluble resin, which were included in Water-based ink composition (TABLE 3) were mixed uniformly or homogeneously; and thus an ink solvent was obtained. Subsequently, the aqueous solution of the water-soluble resin and the ink solvent were added to the anionic self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 3-1 to 3-6 was obtained.

Regarding the water-based inks of Examples 3-1 to 3-6, jetting stability evaluation was performed in a similar manner as Examples 1-1 to 1-5 and Comparative Examples 1-1 and 1-2.

TABLE 3 shows the water-based ink compositions and the evaluation results for the water-based inks of Examples 3-1 to 3-6. Note that TABLE 3 also shows the water-based ink composition and the evaluation result for the water-based ink of Example 1-1.

TABLE 3 (following)—LEGEND

*1: Anionic self-dispersible black pigment (self-dispersible carbon black modified by a carboxylic acid group); produced by Cabot Corporation
*7: Anionic self-dispersible yellow pigment; produced by Cabot Corporation
*8: Anionic self-dispersible magenta pigment; produced by Cabot Corporation
*9: Anionic self-dispersible cyan pigment; produced by Cabot Corporation
*2: Anionic surfactant (a compound represented by the formula (1)); produced by LION SPECIALITY CHEMICALS CO., LTD.
*3: Anionic surfactant (a compound represented by the formula (1)); produced by Kao Corporation Regarding numerals in TABLE 3, those of the self-dispersible pigments and the water-soluble resin indicate solid content amounts and those of the surfactants indicate active ingredients.

TABLE 3

|  |  | Examples | | | | | | |
|---|---|---|---|---|---|---|---|---|
|  |  | 3-1 | 3-2 | 1-1 | 3-3 | 3-4 | 3-5 | 3-6 |
| Water-based ink composition (% by weight) | CAB-O-JET (trade name) 300 (*1) | 8.00 | 8.00 | 8.00 | — | — | — | 8.00 |
|  | CAB-O-JET (trade name) 270Y (*7) | — | — | — | 4.00 | — | — | — |
|  | CAB-O-JET (trade name) 260M (*8) | — | — | — | — | 4.00 | — | — |
|  | CAB-O-JET (trade name) 250C (*9) | — | — | — | — | — | 4.00 | — |
|  | Water-soluble resin 1 — Weight average molecular weight 10000, Acid value 130 mgKOH/g | 0.03 | 0.05 | 0.10 | 0.20 | 0.50 | 0.50 | 1.20 |
|  | SUNNOL (trade name) NL1430 (*2) | 0.02 | 0.10 | — | 0.50 | 1.00 | 0.50 | 7.20 |
|  | EMAL (trade name) 20C (*3) | — | — | 0.15 | — | — | — | — |
|  | Glycerol | 15.00 | 15.00 | 15.00 | 15.00 | 15.00 | 15.00 | 15.00 |
|  | Triethylene glycol-n-butyl ether | 5.00 | 5.00 | 5.00 | 5.00 | 5.00 | 5.00 | 5.00 |
|  | Water | balance | balance | balance | balance | balance | balance | balance |
| Water-soluble resin:Anionic surfactant (C:S) | | 1:0.7 | 1:2 | 1:1.5 | 1:2.5 | 1:2 | 1:1 | 1:6 |
| Jetting stability | | A | AA | AA | AA | AA | AA | A |

As shown in TABLE 3, Examples 3-1 and 3-6 had good evaluation results of jetting stability. Examples 3-2 to 3-5, in each of which the weight ratio between the water-soluble resin (C) and the anionic surfactant (S) was C:S=1:1 to 5, had very good evaluation results of jetting stability.

Examples 4-1 to 4-4

Examples 4-1 to 4-4 were examples using mutually different pigment solid content amounts, different kinds of humectant and surfactant, and different blending amounts. Components, except for the anionic self-dispersible pigment and the water-soluble resin, which were included in Water-based ink composition (TABLE 4) were mixed uniformly or homogeneously; and thus an ink solvent was obtained. Subsequently, the aqueous solution of the water-soluble resin and the ink solvent were added to the anionic self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 4-1 to 4-4 was obtained.

Regarding the water-based inks of Examples 4-1 to 4-4, jetting stability evaluation was performed in a similar manner as Examples 1-1 to 1-5 and Comparative Examples 1-1 and 1-2.

TABLE 4 shows the water-based ink compositions and the evaluation results for the water-based inks of Examples 4-1 to 4-4. Note that TABLE 4 also shows the water-based ink composition and the evaluation result for the water-based ink of Example 3-2.

TABLE 4 (following)—LEGEND
*1: Anionic self-dispersible black pigment (self-dispersible carbon black modified by a carboxylic acid group); produced by Cabot Corporation
*2: Anionic surfactant (a compound represented by the formula (1)); produced by LION SPECIALITY CHEMICALS CO., LTD.

Regarding numerals in TABLE 4, those of the self-dispersible pigment and the water-soluble resin indicate solid content amounts and that of the surfactant indicates an active ingredient.

limited, and the water-based ink is widely applicable to various types of ink-jet recording.

What is claimed is:

1. A water-based ink for ink-jet recording comprising:
   a self-dispersible pigment having an anionic group;
   water;
   a water-soluble resin; and
   an anionic surfactant,
   wherein the water-soluble resin is an ABA-type triblock copolymer which has a polymer block A composed only of methyl methacrylate and methacrylic acid and a polymer block B composed only of benzyl methacrylate and methacrylic acid;
   which has a weight average molecular weight of 3,000 to 30,000; which has an acid value of 90 mgKOH/g to 200 mgKOH/g; and which is partially or completely neutralized.

2. The water-based ink for ink-jet recording according to claim 1, wherein the anionic surfactant is a compound represented by the following formula (1):

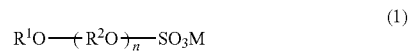

in the formula (1),
R$^1$ is an alkyl group;
R$^2$ is an ethylene group or a propylene group;
n is an integer in a range of 0 to 10; and
M is alkali metal, alkali earth metal, ammonium, or alkanolamine.

3. The water-based ink for ink-jet recording according to claim 1, wherein the anionic surfactant is a compound represented by the following formula (1):

in the formula (1),
R$^1$ is an alkyl group having 8 to 18 carbon atoms;
R$^2$ is an ethylene group;
n is an integer in a range of 1 to 10; and
M is sodium, potassium, or ammonium.

TABLE 4

|  |  |  | Examples | | | | |
| --- | --- | --- | --- | --- | --- | --- | --- |
|  |  |  | 3-2 | 4-1 | 4-2 | 4-3 | 4-4 |
| Water-based ink composition (% by weight) | CAB-O-JET (trade name) 300 (*1) | | 8.00 | 6.00 | 4.00 | 6.00 | 6.00 |
| | | Weight average molecular weight | Acid value mgKOH/g | | | | |
| | Water-soluble resin 1 | 10000 | 130 | 0.05 | 0.05 | 0.05 | 0.05 | 0.05 |
| | SUNNOL (trade name) NL1430 (*2) | | 0.10 | 0.10 | 0.10 | 0.10 | 0.10 |
| | Glycerol | | 15.00 | 15.00 | 15.00 | 10.00 | 15.00 |
| | Polyethylene glycol 200 | | — | — | — | 5.00 | — |
| | Triethylene glycol-n-butyl ether | | 5.00 | 5.00 | 5.00 | 5.00 | 2.00 |
| | Dipropylene glycol n-propyl ether | | — | — | — | — | 1.50 |
| | Water | | balance | balance | balance | balance | balance |
| Water-soluble resin:Anionic surfactant (C:S) | | | 1:2 | 1:2 | 1:2 | 1:2 | 1:2 |
| Jetting stability | | | AA | AA | AA | AA | AA |

As shown in TABLE 4, Examples 4-1 to 4-4 had very good evaluation results of jetting stability.

As described above, the water-based ink of the present teaching has good jetting stability. The way of use of the water-based ink of the present teaching is not particularly 4. The water-based ink for ink-jet recording according to claim 1, wherein a weight ratio of a blending amount of the anionic surfactant in the water-based ink to a blending amount of the water-soluble resin in the water-based ink is in a range of 1 to 5.

5. The water-based ink for ink-jet recording according to claim 1, wherein the water-based ink contains the water-soluble resin in a range of 0.04% by weight to 1% by weight.

6. The water-based ink for ink-jet recording according to claim 1, wherein the water-based ink contains the anionic surfactant in a range of 0.04% by weight to 1.5% by weight.

7. The water-based ink for ink-jet recording according to claim 1, wherein a weight ratio of a blending amount of the self-dispersible pigment having the anionic group in the water-based ink to a blending amount of the water-soluble resin in the water-based ink is in a range of 2 to 300.

8. The water-based ink for ink-jet recording according to claim 1, wherein a weight ratio of a blending amount of the self-dispersible pigment having the anionic group in the water-based ink to a total blending amount of the water-soluble resin and the anionic surfactant in the water-based ink is in a range of 1 to 160.

9. The water-based ink for ink-jet recording according to claim 1, wherein a ratio of a weight average molecular weight of the polymer block A to a weight average molecular weight of the polymer block B is in a range of 0.2 to 8.

10. The water-based ink for ink-jet recording according to claim 1, wherein a weight ratio of the methyl methacrylate to the methacrylic acid in the polymer block A is in a range of 1.7 to 3.8; and a weight ratio of the benzyl methacrylate to the methacrylic acid in the polymer block B is in a range of 3.8 to 32.0.

11. The water-based ink for ink-jet recording according to claim 1, wherein the ABA-type triblock copolymer is neutralized by potassium hydroxide.

12. The water-based ink for ink-jet recording according to claim 1, wherein the self-dispersible pigment having the anionic group is self-dispersible carbon black modified by a carboxylic acid group, self-dispersible carbon black modified by a sulfonic acid group, or self-dispersible carbon black modified by a phosphoric acid group.

13. The water-based ink for ink-jet recording according to claim 1, further comprising glycerol and triethylene glycol-n-butyl ether.

14. An ink cartridge, comprising the water-based ink for ink-jet recording as defined in claim 1.

* * * * *